United States Patent [19]

Matsumura et al.

[11] Patent Number: 4,814,997

[45] Date of Patent: * Mar. 21, 1989

[54] METHOD AND APPARATUS FOR ESTIMATING AN ATMOSPHERIC PRESSURE BASED ON AN INTACT AIR PRESSURE AT A CERTAIN TIME

[75] Inventors: Toshimi Matsumura, Aichi; Norio Omori, Kariya; Hisanori Kobayashi, Aichi, all of Japan

[73] Assignee: Nippondenso Co., Ltd., Kariya, Japan

[ * ] Notice: The portion of the term of this patent subsequent to May 20, 2003 has been disclaimed.

[21] Appl. No.: 51,168

[22] Filed: May 18, 1987

Related U.S. Application Data

[60] Continuation of Ser. No. 796,795, Nov. 12, 1985, abandoned, which is a division of Ser. No. 427,536, Sep. 29, 1982, Pat. No. 4,590,563.

[30] Foreign Application Priority Data

Oct. 14, 1981 [JP] Japan .................................. 56-164841

[51] Int. Cl.[4] ...................... F02D 35/00; F02D 41/26; F02P 5/15
[52] U.S. Cl. .............................. 364/431.05; 123/412; 123/416; 123/488; 364/431.10; 364/558
[58] Field of Search ...................... 364/431.05, 431.10, 364/558; 123/412, 416, 424, 488, 138 DB

[56] References Cited

U.S. PATENT DOCUMENTS

| | | | |
|---|---|---|---|
| 4,157,699 | 6/1979 | Mori | 123/424 X |
| 4,271,797 | 6/1981 | McCarbery | 123/412 |
| 4,307,691 | 12/1981 | Nagae et al. | 123/412 X |
| 4,372,274 | 2/1983 | Takase | 123/424 X |
| 4,385,606 | 5/1983 | Hattori et al. | 123/416 |
| 4,416,234 | 11/1983 | Ikeura | 123/424 |
| 4,442,812 | 4/1984 | Mizuno et al. | 123/424 X |

FOREIGN PATENT DOCUMENTS 2069597  4/1980  United Kingdom ................ 123/412

Primary Examiner—Felix D. Gruber
Attorney, Agent, or Firm—Cushman, Darby & Cushman

[57] ABSTRACT

A system for correcting for atmospheric pressure without using an atmospheric pressure sensor. A single pressure sensor measures air pressure in the intake manifold of a fuel injected engine. A control unit controls the fuel amount and injection timing in accordance with various engine parameters. The intake pressure at a predetermined time is estimated as being indicative of atmospheric pressure. This intake pressure may be further corrected to provide a better estimate. When the engine operates at a low speed and high load, this pressure data is also indicative of atmospheric pressure. The amount of fuel to be injected and the ignition timing can be controlled using this updated atmospheric data. This provides better operation of the system.

15 Claims, 5 Drawing Sheets

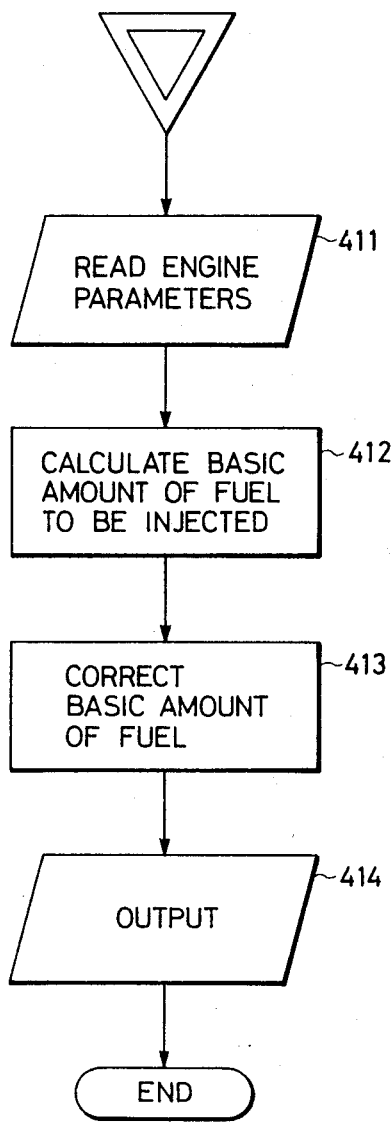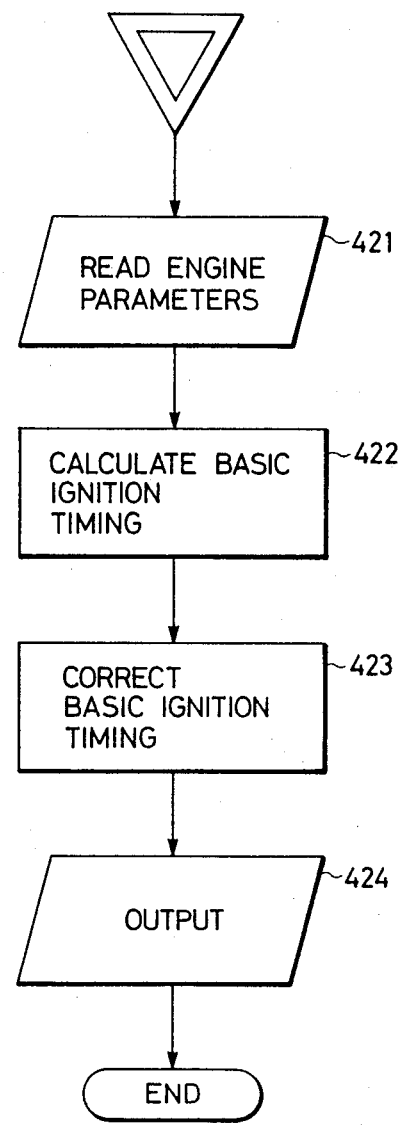

METHOD AND APPARATUS FOR ESTIMATING AN ATMOSPHERIC PRESSURE BASED ON AN INTACT AIR PRESSURE AT A CERTAIN TIME

This is a continuation of application Ser. No. 796,795, filed Nov. 12, 1985, which was abandoned upon the filing hereof, which was a division of Ser. No. 427,536 filed Sept. 29, 1982, now U.S. Pat. No. 4,590,563 issued May 20, 1986.

BACKGROUND OF THE INVENTION

This invention relates generally a to method and apparatus for controlling an internal combustion engine in accordance with various information including atmospheric pressure.

A speed density control system (referred to as S-D system) is known for controlling an internal combustion engine, such as an engine of a motor vehicle. This system calculates a necessary amount of fuel using two parameters. These parameters include one parameter indicative of the air pressure in the intake manifold, and another parameter indicative of the rotational speed of the engine crankshaft.

When an internal combustion engine is controlled with such a conventional S-D system without effecting a feedback control, the air/fuel ratio of the air/fuel mixture supplied to the engine is apt to be deviated toward the lean side when atmospheric pressure (Patm) decreases when a motor vehicle is driven at a high altitude. This is because it cannot be unequivocally determined that exhaust manifold pressure (Pr) decreases and volumetric efficiency ($\eta v$) increases when the amount of fuel is determined on the basis of only the intake manifold pressure (Pm) and engine speed (N). This fact is indicated by the following formula (1), and as a result of such deviation in air/fuel ratio, the drivability and engine starting condition become poor.

$$\eta v \propto (Pm/Patm) X[1+(1-Pr/Pm)/(K^{(\epsilon-1)}] \quad (1)$$

wherein
K is a constant; and
$\epsilon$ is a compression ratio.

In order to compensate for such undesirable deviation of the air/fuel ratio toward the lean side, an atmospheric pressure sensor or an exhaust gas pressure sensor has been employed independent of the intake manifold pressure sensor. However, such as engine control system suffers from an increase in cost inasmuch as it requires two separate pressure sensors, while high reliability is not ensured because of variations in accuracy between two separate sensors.

SUMMARY OF THE INVENTION

The present invention has been developed in order to remove the above-described drawbacks inherent to the conventional engine control system.

It is, therefore, an object of the present invention to provide method and apparatus for controlling an internal combustion engine so that air/fuel ratio of the air/fuel mixture supplied to the engine and ignition timing are controlled in accordance with intake manifold pressure corrected by atmospheric pressure which can be obtained by detecting the pressure in the intake manifold before the engine is started and also when the engine operates in a particular condition. Namely, a single pressure sensor can be used not only as an intake manifold vacuum sensor but also as an atmospheric pressure sensor by reading data therefrom under different engine operational conditions.

Another object of the present invention is to provide such method and apparatus which can update the atmospheric pressure data without stopping the engine. Therefore, when a motor vehicle travels in a high altitude place, the intake manifold vacuum data measured by the pressure sensor can be corrected by updated atmospheric pressure so that air/fuel ratio and ignition timing are desirably controlled irrespective of altitude change.

A further object of the present invention is to provide a low cost engine control apparatus which is reliable.

This is performed according to the present invention by providing a means for sensing an intake air pressure a means for sensing a rotational speed of the engine and a means for sensing a load of the engine. Based on these three sensed parameters, an atmospheric pressure can be estimated. A control means produces a discrimination output when the sensed rotational speed is below a predetermined speed and the sensed load is above a predetermined load simultaneously. The sensed intake air pressure is used as an estimate of an actual atmospheric pressure at the time when this discrimination output is produced. The inventors of the present invention have found that this time provides a good indication of when the intake air pressure is substantially equal to atmospheric pressure. A control amount for the engine is then produced based on parameters including the estimated atmospheric pressure.

BRIEF DESCRIPTION OF THE DRAWINGS

The object and features of the present invention will become more readily apparent from the following detailed description of the preferred embodiment taken in conjunction with the accompanying drawings in which:

FIGS. 5A and 5B are flowcharts showing two interrupt service routines for the operation of the CPU of FIG. 2.

The same or corresponding elements and parts are designated at like reference numerals throughout the drawings.

DETAILED DESCRIPTION OF THE INVENTION

Figure 1:
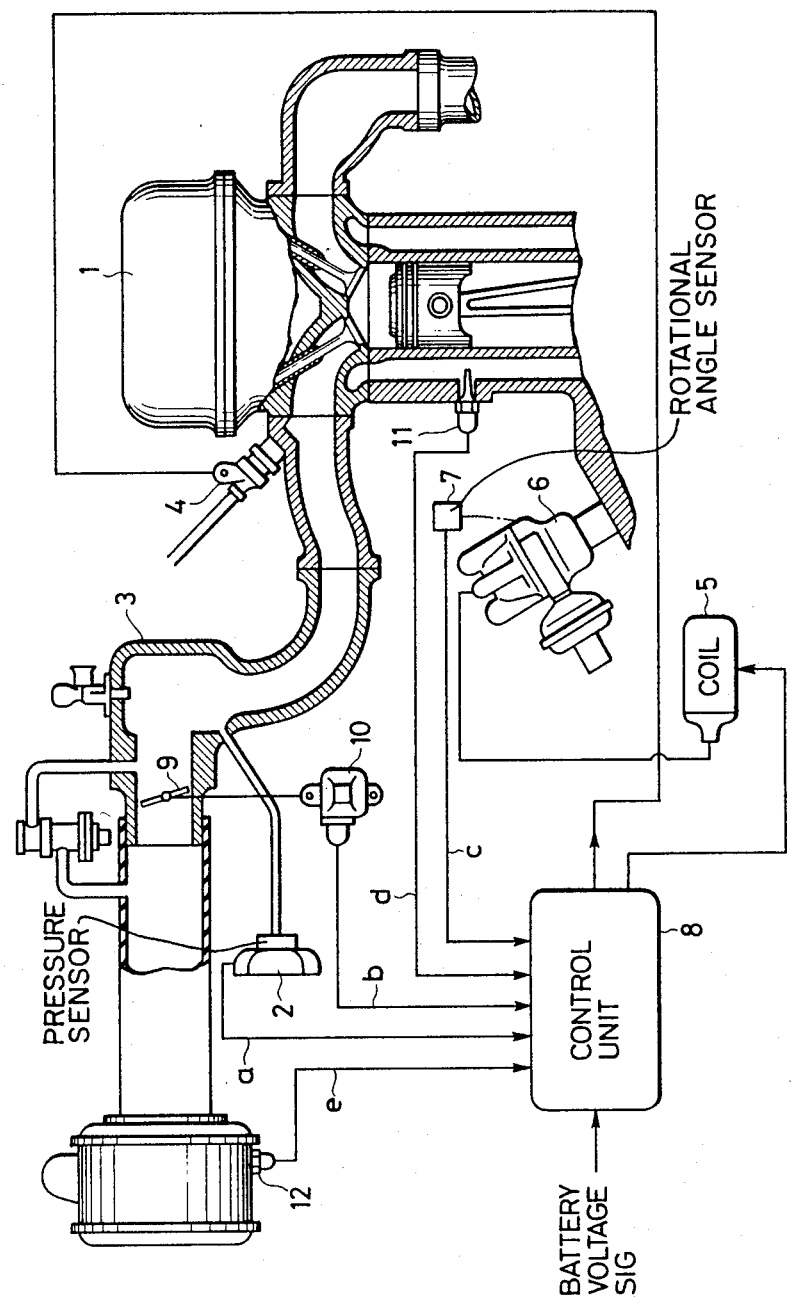
FIG. 1 is a schematic diagram of an embodiment of the apparatus according to the present invention.

Referring to FIG. 1 of the drawings, a schematic illustration of an embodiment of the apparatus for controlling an internal combustion engine is shown. The invention will be described in connection with a 6-cylinder internal combustion engine. The apparatus comprises a semiconductor type intake manifold pressure sensor 2 which is arranged to detect the pressure inside an intake manifold 3. A plurality of fuel injection valves 4 are provided in such a manner that each valve 4 is disposed in the vicinity of an intake port of each cylinder of the engine 1 (only one fuel injection valve 4 is shown for simplicity). The fuel injection valves 4 are of the electromagnetic type and fuel is sent thereto via a conduit under a constant pressure.

An ignition system of the engine 1 comprises an ignition coil 5, a distributor 6 and a plurality of spark plugs (not shown for simplicity). The ignition coil 5 produces a high voltage which is distributed by the distributor 6 to each of the spark plugs provided to each cylinder. The distributor 6 has a rotary shaft (not shown) arranged to rotate once per two revolutions of the engine crankshaft (not shown), and comprises therein a rotational angle sensor 7 for detecting the engine speed. The rotational angle sensor 7 produces a pulse train signal synchronized with the engine revolution, and the number of pulses per unit time will be counted as will be described later to measure the rotational speed of the engine 1.

Throttle sensor 10 is provided to detect an open or closed position of the throttle valve 9 disposed in the intake manifold 3. Coolant temperature sensor 11 is attached to the engine casing. When the engine is warmed up, such will be detected by the coolant sensor 11. An intake air temperature sensor 12 is provided at an upper stream portion of the intake manifold 3.

An electronic control unit 8 including a microcomputer is provided to control the fuel injection valves 4 and the ignition system. Namely, various values or data from the pressure sensor 2, rotational angle sensor 7, throttle sensor 10, coolant temperature sensor 11, and intake air temperature sensor 12 is fed to the electronic control unit 8 to calculate the necessary amount of fuel to be fed to the engine 1 via the fuel injection valves 4 and necessary ignition timing.

Figure 2:
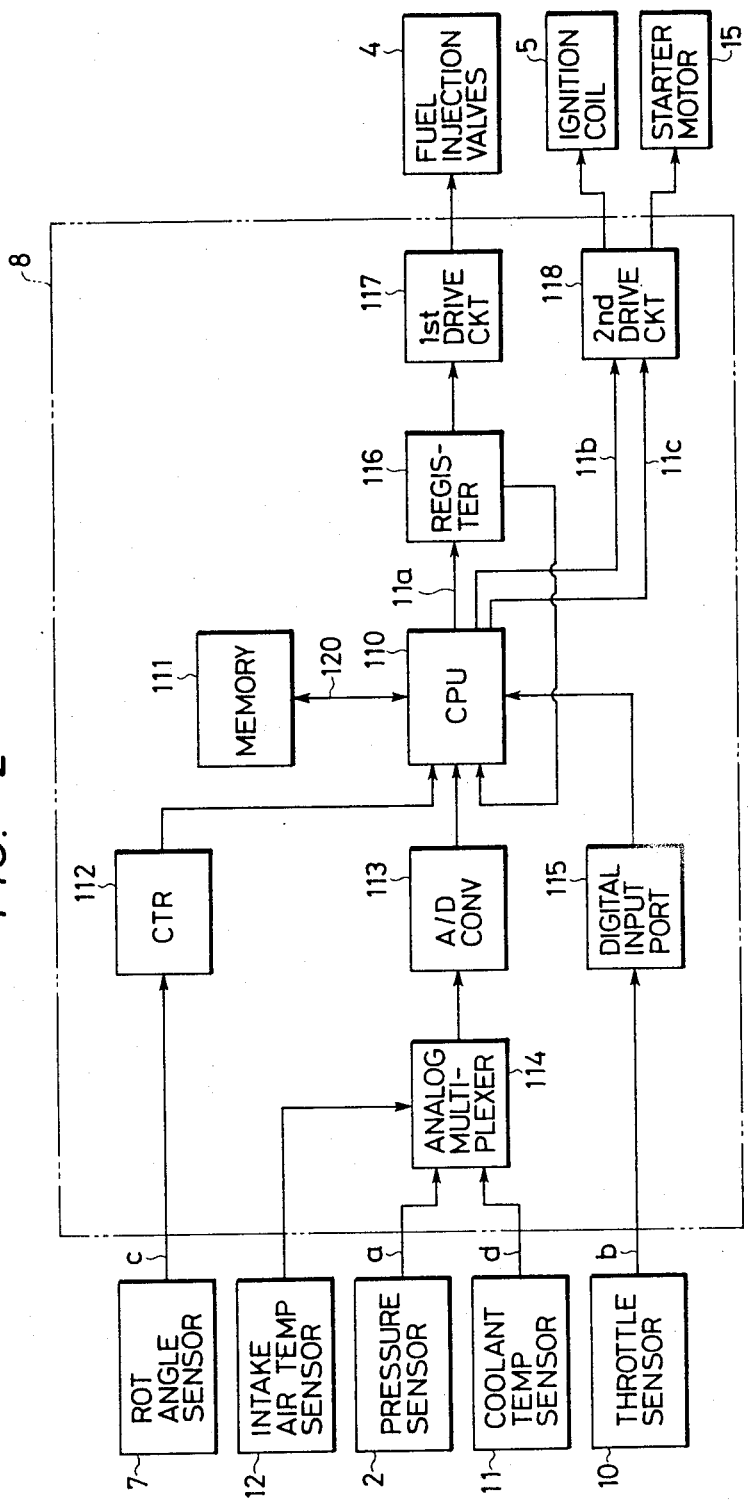
FIG. 2 is a schematic block diagram of the control unit used in the apparatus of FIG. 1.

FIG. 2 shows a block diagram of the electronic control unit 8 of FIG. 1. The electronic control unit comprises a central processing unit (CPU) 110, a memory 111, and various peripheral units. A control program for controlling the engine 1 is prestored in the memory 111, and is arranged to be read out via a bus 120. A counter 112 is provided to measure the rotational speed of the engine 1 in accordance with a signal "c" from the rotational angle sensor built into the distributor 6. The counter 112 comprises a 12-bit binary counter, and is arranged to send an output signal indicative of the rotational speed of the engine 1 through a bus to the CPU 110. An analog multiplexer 114 is connected to the intake manifold pressure sensor 2, the intake air temperature sensor 12, and the coolant temperature sensor 11 so that data indicative of the intake manifold pressure, the intake air temperature, and the coolant temperature is selected to be fed to an A/D converter 113 in which analog data is converted into digital data which is fed to the CPU 110 as input data. The CPU 110 calculates the amount of fuel to be injected in synchronism with the rotation of the engine 1 using mainly rotational speed information (N) from the counter 112 and intake manifold pressure information (Pm) from the A/D converter 113. The CPU 110 finally produces a digital output signal 11a indicative of the results of the above calculation with a correction factor based on coolant temperature information from the A/D converter 113. A digital input port 115 is provided to receive an on-off signal "b" from the throttle sensor 10 so that a throttle valve opening degree detection signal will be fed to the CPU 110.

A register 116 is provided to receive the output digital signal 11a from the CPU 110, and this digital output is converted into a pulse signal indicative of fuel injection time length or valve opening time of the fuel injection valves 4. The output pulse signal from the register 116 is fed to a first drive circuit 117 which includes an amplifier for amplifying the output pulse from the register 116. The amplified signal or drive signal is then fed to the fuel injection valves 4 to open the same. Lines shown between the counter 112 and the CPU 110, between the A/D converter 113 and the CPU 110, between the digital input port 115 and the CPU 110, and between the register 116 and the CPU 110 are all busses, and these busses may be implemented by using a common bus including the bus 120 between the memory 111 and the CPU 110.

A second drive circuit 118 is responsive to output signals from the CPU 110 to drive the ignition coil 5 and a starter motor 15. The second drive circuit 118 is provided to disable the ignition coil 5 and the starter motor 15 until some data is read by the CPU 110 when an ignition switch (not shown) is turned on. Namely, as will be described in detail later, when the ignition switch is turned on, the CPU 110 initializes various information prestored and immediately after this initialization first intake manifold pressure information (Pm) from the intake manifold pressure sensor 2 is read. After completion of reading of this information, the ignition coil 5 and the starter motor 15 are made operable.

Figure 3:
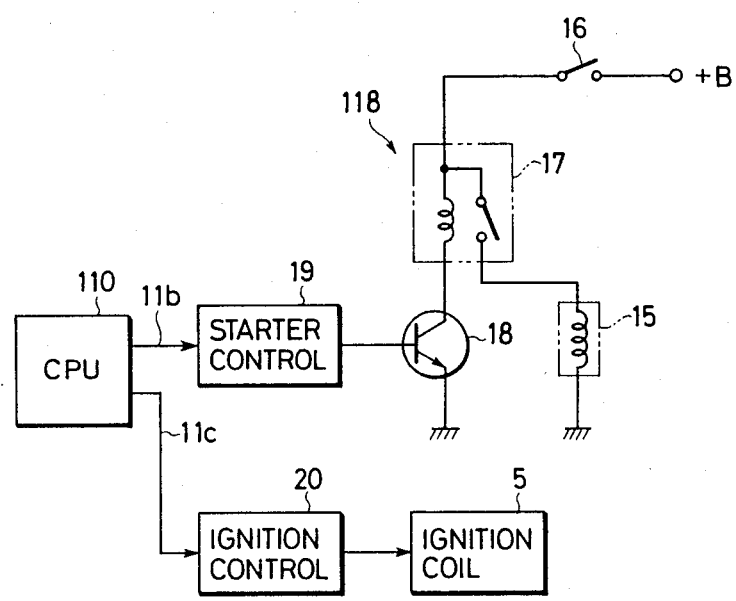
FIG. 3 is a schematic diagram of the second drive circuit used in the control unit of FIG. 2.

FIG. 3 illustrates a schematic diagram of the second drive circuit 118 and its associated elements. In FIG. 3, the reference 16 indicates a start switch for supplying electrical power +B from a vehicle battery (not shown) to one end of a coil of a starter drive relay 17. The starter switch 16 and the above-mentioned ignition switch are controlled by a key switch, and the starter switch 16 is arranged to be turned on after the ignition switch is turned on in the same manner as in most conventional motor vehicles. An collector-emitter path of a transistor 18 is interposed between the other end of the coil of the starter driver relay 17 and ground. The starter drive relay 17 comprises a normally-open movable contact connected to the starter switch 16 so that the starter motor 15 receives electrical power via the movable contact of the relay 17 when the relay 17 is energized. A starter control circuit 19 is responsive to an operation permission signal 11b from the CPU 110 for generating a bias signal fed to the base of the transistor 18. Namely, the transistor 18 is rendered conductive only when the operation permission signal 11b is produced by the CPU 110, and thus the starter motor 15 is not supplied with power until the operation permission signal 11b is generated by the CPU 110.

An ignition control circuit 20 is responsive to an ignition command signal 11c from the CPU 110 for producing a drive signal with which the ignition coil 5 is excited. Therefore, the ignition coil 5 does not operate until the ignition command signal 11c is generated by the CPU 110.

Figure 4:
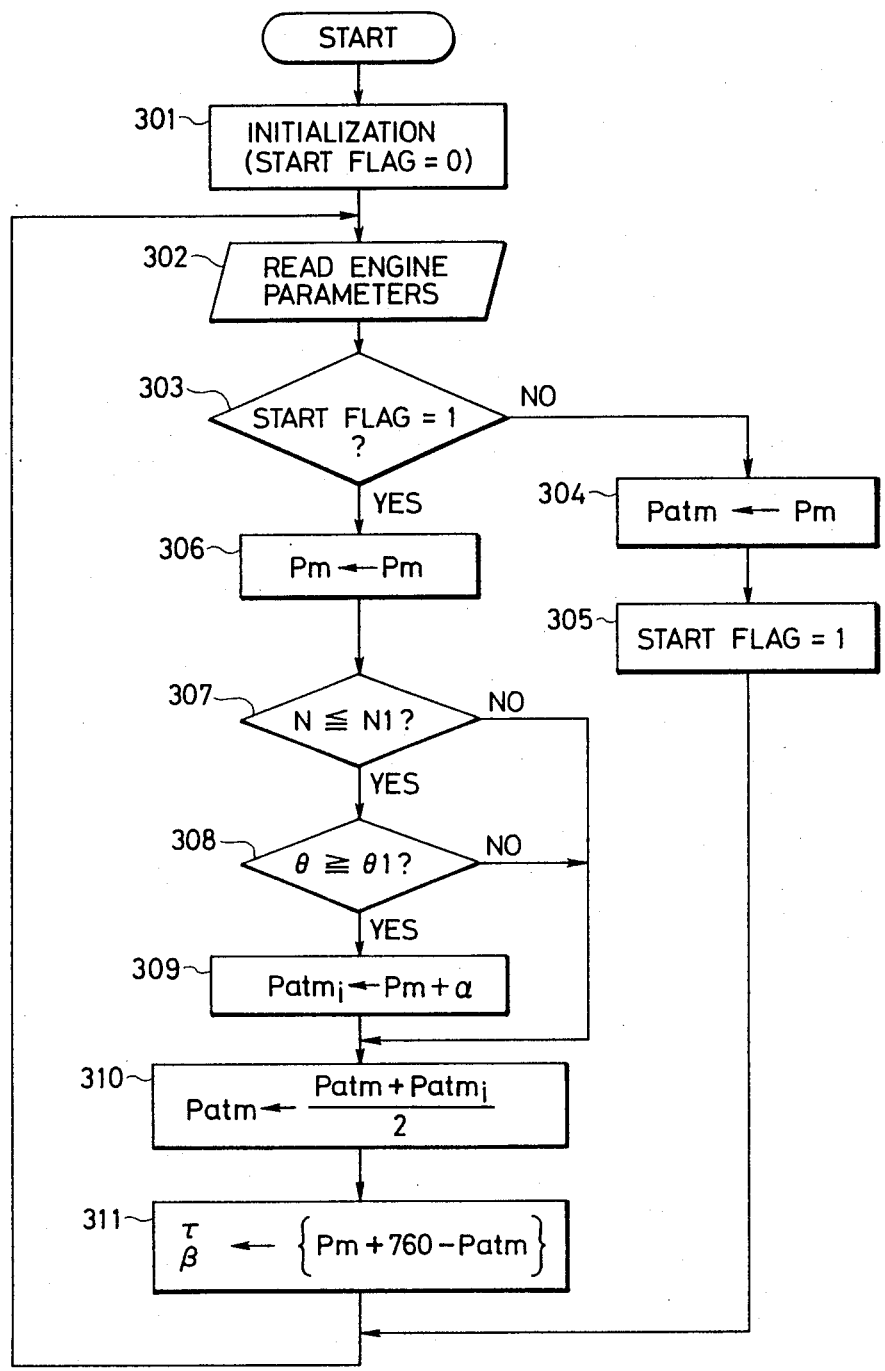
FIG. 4 is a flowchart showing the main routine of the control program of the CPU used in the control unit of FIG. 2.

The operation of the apparatus according to the present invention will be described with reference to a flowchart of FIG. 4 showing a control program for processing pressure information or data. When the ignition switch is turned on, the CPU 110 starts operating by a detection from key switch detector 598 and initialization is effected in step 301 as described in the above by setting initial values. At this time, a start flag is set to logic "0" so that the starter motor 15 does not operate until data of atmospheric pressure (Patm) is read once. In a following step 302, various engine parameters, such as coolant temperature, intake air temperature, intake pressure, and engine speed, are read. Then in step 303, it is detected whether the start flag has been reset to "1" or not. Since the start flag has been set to "0" in step 301, the answer of step 303 is NO, so that step 304 is performed. In step 304, the intake manifold pressure Pm is regarded as the atmospheric pressure Patm, because no vacuum is produced by the engine 1 when the engine 1 is not operating. Namely, the intake pressure Pm is stored as the atmospheric pressure Patm. Then in step 305, the start flag is reset to "1". A logic "1" value of the start flag indicates that the intake pressure Pm has been stored as the atmospheric pressure Patm. After this, the operational flow returns to the step 302 to read the above-mentioned various engine parameters and to prepare for engine starting.

After step 302, it is detected whether the start flag has been reset to "1" in step 303 again. Since the intake manifold pressure Pm has been read as the atmospheric pressure Patm in step 304 in advance, namely, since the start flag has been reset to "1" in step 305, the answer of step 303 becomes YES. Thus, the intake pressure Pm is stored as a normal intake manifold pressure Pm in step 306.

Steps 307 to 311 following the step 306 are provided to simulate the atmospheric pressure Patm when the actual atmospheric pressure varies in a travelling condition of the motor vehicle. Namely, the intake pressure Pm will be used as a value indicative of the atmospheric pressure Patm when the engine operates at a low speed and high load. In step 307, first of all, it is detected whether the engine rotational speed N is equal to or below a predetermined rotational speed N1. In step 308, it is detected whether the opening degree $\theta$ of the throttle valve 9 is equal to or greater than a predetermined opening degree $\theta$1. Only when both the answers of the steps 307 and 308 are YES, step 309 takes place in which the intake pressure Pm added with a predetermined offset value $\alpha$ is stored as the atmospheric pressure Patmi. Namely, when the engine 1 operates at a low speed (N$\leq$N1) and under high load ($\theta$$\geq$$\theta$1), the pressure Pm in the intake manifold 3 is close to the atmospheric pressure Patmi with a slight difference therebetween. In order to compensate for this difference between the actual atmospheric pressure Patmi and the measured pressure Pm in the intake manifold 3, the above-mentioned offset value $\alpha$ is added to the measured pressure Pm. This offset value $\alpha$ equals the difference, such as 20 to 30 mm Hg, between normal pressure (760 mm Hg) and a predetermined pressure indicative of a typical pressure in the intake manifold 3 obtained when the engine 1 operates at a low speed and under high load.

In step 310, the value of atmospheric pressure Patmi obtained in the above step 309 and the first obtained value of atmospheric pressure Patm in the step 304 are averaged to compensate for variations in measured atmospheric pressure data. Namely, Patm and Patmi which have been respectively obtained hitherto are added to each other, and the sum is divided by two to obtain an average value of the atmospheric pressure Patm which will be stored and used as present data or updated data of the atmospheric pressure Patm. This updated data of the atmospheric pressure Patm will be used to further update the atmospheric pressure Patm when step 310 is executed in later cycles.

In step 311, the present data of the atmospheric pressure Patm obtained in step 310 is used for determining a fuel amount correction factor $\tau$ and an ignition timing correction factor $\beta$. Namely, the intake pressure Pm actually measured is corrected by adding the difference between normal pressure (760 mm Hg) and the present atmospheric pressure Patm thereto. Then, the corrected value is added or multiplied by some coefficients to obtain these correction factors $\tau$ and $\beta$. These correction factors $\tau$ and $\beta$ will be used to finally determine the amount of fuel to be injected into engine cylinders and the ignition timing.

In the above-described embodiment, although the first time detection of the intake pressure is performed immediately after the ignition switch is turned on, this detection may be effected at any time as long as the intake pressure is substantially equal to the atmospheric pressure before the engine 1 is started. In other words, the timing for the detection of the intake pressure before engine starting may be derived from other information. For instance, since a door of the motor vehicle must be opened before the vehicle driver gets in the motor vehicle, a signal from a door switch may be used to provide such a timing. Alternatively, a signal from a seat switch, indicative of the presence of a seated driver, may be used. The flowchart of FIG. 4 may be modified by replacing the signal from the ignition switch with another signal from the door switch or seat switch.

FIGS. 5A and 5B respectively show two flowcharts of interrupt routines for calculating the fuel injection amount and ignition timing. Interrupts are generally arranged to occur in accordance with a signal indicative of a predetermined angle of the engine 1 crankshaft, and in the embodiment of the present invention, the interrupt service routines of FIGS. 5A and 5B are executed in response to interrupts command signals respectively produced when the engine crankshaft assumes first and second predetermined angles.

In the interrupt routine of FIG. 5(A), the fuel amount is calculated. At the beginning, various necessary engine parmeters, such as the atmospheric pressure Patm, intake pressure Pm, engine speed N, intake air temperature, coolant temperature, battery voltage etc, are read out in step 411. Then in step 412, a basic fuel amount is calculated on the basis of the intake pressure Pm and the engine speed N using a map stored in the memory 111. In a following step 413, the basic fuel amount is corrected in accordance with various engine parameters to obtain a final amount of fuel. The data indicative of the final fuel amount is output in step 414. This data is fed to the register 116 as the above-mentioned signal 11a so that fuel injection valves 4 are energized to supply a given amount of fuel to maintain the air/fuel ratio at a desirable point, such as the stoichiometric value. In the above step 413, the fuel amount can be corrected to compensate for the deviation of the air/fuel ratio due to variation in atmospheric pressure experienced when the engine 1 is operated at a high altitude place. Namely, the aforementioned first correction factor $\tau$ is used to correct the basic amount of fuel.

In the interrupt service routine of FIG. 5B, the ignition timing of the engine 1 is determined. At the beginning, various necessary engine parameters, such as the intake pressure Pm, engine speed N, coolant temperature etc, are read out in step 421. Then in step 422, a basic ignition timing is calculated on the basis of the engine speed N. In a following step 423, a timing advance angle is obtained so that the basic ignition timing obtained in step 422 is corrected thereby to produce data indicative of final ignition timing. When obtaining the advance angle, the aforementioned second correction factor $\beta$ will be used so that ignition timing will be controlled on the basis of corrected intake pressure. The data indicative of the final ignition timing is output in step 424. This data is fed to the second drive circuit 118 as the above-mentioned operation permission signal signal 11b so that the ignition coil 5 is energized to fire the spark plugs.

From the foregoing description it will be understood that although the microcomputer used in the control unit 8 normally reads the signal indicative of the intake pressure as intake air vacuum pressure data, the pressure data is also read as the atmospheric pressure in the two cases, namely before the engine 1 is started, and when the engine 1 operates at a low speed and under high load. Thus, the apparatus according to the present invention requires only a single pressure sensor, providing a low cost control apparatus. Furthermore, there is no need to consider the variations between two pressure sensors. This enables the control apparatus to be reliable.

In the above embodiment, although the pressure sensor is of the type of measuring absolute pressure, a gauge pressure sensor may also be used.

The above-described embodiment is just an example of the present invention, and therefore, it will be apparent for those skilled in the art that many modifications and variations may be made without departing from the spirit of the present invention.

What is claimed is:

1. An apparatus for controlling an internal combustion engine of a motor vehicle, comprising:
   means for sensing an intake air pressure in an intake passage of said engine;
   means for sensing a rotational speed of said engine;
   means for sensing a load of said engine;
   control means for: (1) discriminating operating conditions of said engine in response to the sensed rotational speed and the sensed load, and producing a discrimination output when a first condition and a second condition simultaneously exist, said first condition existing when the sensed rotational speed is below a predetermined speed and said second condition existing when the sensed load is above a predetermined load;
   (2) determining the sensed intake air pressure when said discrimination output is produced, as an estimate of an actual atmospheric pressure; and
   (3) determining a control amount for said engine in accordance with the sensed intake air pressure, the sensed rotational speed and the estimated atmospheric pressure while said engine is operating.

2. An apparatus according to claim 1, wherein said control means is also for:
   (4) correcting the sensed intake air pressure by a predetermined correction value when said discrimination output is produced; and
   (5) storing the corrected intake air pressure as the estimated atmospheric pressure to be used to calculate said control amount.

3. An apparatus according to claim 2, wherein said control means is also for
   (6) averaging the corrected intake air pressure and a previously stored pressure which is a stored sensed intake air pressure and for storing the average intake air pressure as the atmospheric pressure.

4. An apparatus according to claim 1, further comprising:
   means for detecting at least one of opening of a door of said motor vehicle and a seating of a vehicle driver on a seat of said motor vehicle and producing a detection output; and
   wherein said control means is also for detecting an atmospheric pressure from the sensed intake air pressure when said detection output is produced.

5. An apparatus according to claim 1, wherein said load sensing means comprises means for sensing an opening angle of a throttle valve in said intake passage as the load of said engine.

6. An apparatus for controlling an internal combustion engine of a motor vehicle comprising:
   first means, responsive to an intake air pressure in an intake passage of said engine, for producing a first output indicative of the intake air pressure; and
   control means for: (1) discriminating load conditions of said engine and producing a second output indicative of a heavy load condition in which the intake air pressure is close to an atmospheric pressure;
   (2) obtaining an estimate of atmospheric pressure from said first output each time said second output is produced and producing a third output indicative of said estimated atmospheric pressure;
   (3) storing said third output indicative of the estimated atmospheric pressure, and updating the stored third output each time said atmospheric pressure is estimated; and
   (4) determining a control amount for said engine in accordance with operating conditions of said engine including at least the stored third output indicative of the simulated intake air pressure.

7. An apparatus for controlling an internal combustion engine of a motor vehicle which operates when a key switch of said motor vehicle is turned on, comprising:
   a pressure sensor for sensing an intake air pressure in an intake passage of said engine;
   a speed sensor for sensing a rotational speed of said engine;
   a load sensor for sensing a load of said engine;
   a fuel injector provided on said engine for injecting, when activated, fuel into said engine;
   a spark plug provided on said engine for igniting, when activated, the injected fuel; and
   programmed computer means, operative when said key switch of said motor vehicle is turned on, for controlling activations of at least one of said fuel injector and said spark plug, said programmed computer for:
   (1) storing, responsive to a change in position of said key position to a turning on condition from a turn-off condition, the intake air pressure sensed by said pressure sensor immediately after the turning-on of said key switch as a first atmospheric pressure;
   (2) discriminating whether the rotational speed sensed by said speed sensor is below a predetermined speed reference and producing an output indicative of a low speed condition;
   (3) discriminating whether the load sensed by said load sensor is above a predetermined load reference and producing an output indicative of a high load condition;
   (4) correcting, by a predetermined correction value, the intake air pressure sensed by said pressure sensor when the low speed and high load are both produced and storing the corrected intake air pressure as a second atmospheric pressure; and
   (5) determining a control amount for at least one of said fuel injector and said spark plug in accordance with the sensed rotational speed, the sensed intake air pressure and the stored atmospheric pressure, and using said first atmospheric pressure until the second atmospheric pressure is stored and using the second atmospheric pressure thereafter.

8. A method for controlling an internal combustion engine of a motor vehicle, comprising the steps of:
sensing an intake air pressure in an intake passage of said engine;
sensing a rotational speed of said engine;
sensing a load of said engine;
discriminating operating conditions of said engine in response to the sensed rotational speed and the sensed load;
producing a discrimination output when both the sensed rotational speed is below a predetermined speed and sensed load is above a predetermined load;
using the sensed intake air pressure as an estimate of actual atmospheric pressure when said discrimination output is produced; and
determining a control amount for said engine in accordance with the sensed intake air pressure, the sensed rotational speed and the estimated atmospheric pressure.

9. A method as claimed in claim 8, further comprising the steps of:
correcting the sensed intake air pressure by a predetermined correcting value when the discrimination amount is produced; and
storing, in a storage location of a memory, the corrected intake air pressure as the estimated atmospheric pressure to be used when said control amount is determined.

10. A method as claimed in claim 9, further comprising a step of averaging the currently corrected intake air pressure with the previously stored atmospheric pressure and storing the average intake air pressure in said memory as the currently estimated atmospheric pressure.

11. A method as claimed in claim 8, further comprising the steps of:
detecting at least one of an opening of a door of said motor vehicle and a seating of a vehicle driver on a seat of said motor vehicle;
producing a detection output when a detection is made in said detecting step; and
estimating an atmospheric pressure from the sensed intake air pressure when said detection output is produced.

12. A method as claimed in claim 8, wherein the step of sensing a load of said engine comprises a step of sensing an opening angle of a throttle valve in said intake passage.

13. A method for controlling an internal combustion engine of a motor vehicle, comprising the steps of:
sensing an intake air pressure in an intake passage of said engine;
producing a first output indicative of the sensed intake air pressure;
discriminating load conditions of said engine;
producing a second output indicative of a heavy load condition in which the sensed intake air pressure is close to an atmosphere pressure;
estimating an atmospheric pressure based on said first output at a time of producing said second output;
producing a third output indicative of the estimated atmospheric pressure;
storing said third output in a storage location of a memory;
updating the stored third output each time the atmospheric pressure is newly estimated; and
determining a control amount for said engine in accordance with at least the stored third output.

14. A method for controlling an internal combustion engine of a motor vehicle, comprising the steps of:
sensing an intake air pressure in an intake passage of said engine;
sensing a rotational speed of said engine;
sensing a load of said engine;
storing the sensed intake air pressure at a time immediately after a turning-on of a key switch of said vehicle in a memory of a control unit provided on said vehicle as a first atmospheric pressure;
discriminating whether the sensed rotational speed is below a predetermined speed reference;
producing a first output signal when the sensed rotational speed is below said speed reference;
discriminating whether the sensed load is above a predetermined load reference;
producing a second output signal when the sensed load is above said load reference;
correcting, by a predetermined correction value, the sensed intake air pressure when said first and second output signals are both produced;
storing the corrected intake air pressure in said memory as a second atmospheric pressure; and
determining at least one of a fuel injection amount and an ignition timing for a spark plug which are both provided on said engine, in accordance with the sensed rotational speed, the sensed intake air pressure, and at least one of said first and second atmospheric pressures.

15. A method as claimed in claim 14, wherein said step of determining the control amount comprises a step of determining the control amount using said first atmospheric pressure in response to the absence of said second atmospheric pressure and using said second atmospheric pressure thereafter.

* * * * *